No. 624,307. Patented May 2, 1899.
S. CRAWSHAW.
PIPE SCRAPER.
(Application filed Sept. 24, 1898.)

(No Model.)

WITNESSES:

INVENTOR
Samuel Crawshaw
BY
ATTORNEYS.

THE NORRIS PETERS CO., PHOTO-LITHO., WASHINGTON, D. C.

UNITED STATES PATENT OFFICE.

SAMUEL CRAWSHAW, OF OAMARU, NEW ZEALAND.

PIPE-SCRAPER.

SPECIFICATION forming part of Letters Patent No. 624,307, dated May 2, 1899.

Application filed September 24, 1898. Serial No. 691,787. (No model.)

*To all whom it may concern:*

Be it known that I, SAMUEL CRAWSHAW, of Oamaru, in the county of Waitaki, in the Province of Otaga, New Zealand, have invented new and useful Improvements in Tube-Scrapers, of which the following is a full, clear, and exact description.

This invention relates to improvements in tools for scraping the interior of boiler-tubes, water-tubes, or the like; and the object is to provide a scraper which may be readily adapted to various sizes of tubes and to so construct the device that it may be operated manually or by steam or water pressure.

I will describe a tube-scraper embodying my invention and then point out the novel features in the appended claim.

Reference is to be had to the accompanying drawings, forming a part of this specification, in which similar characters of reference indicate corresponding parts in all the views.

Figure 1:
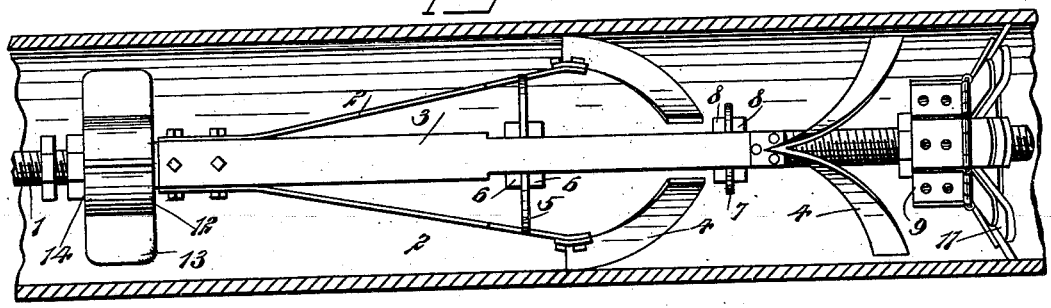
Figure 2:
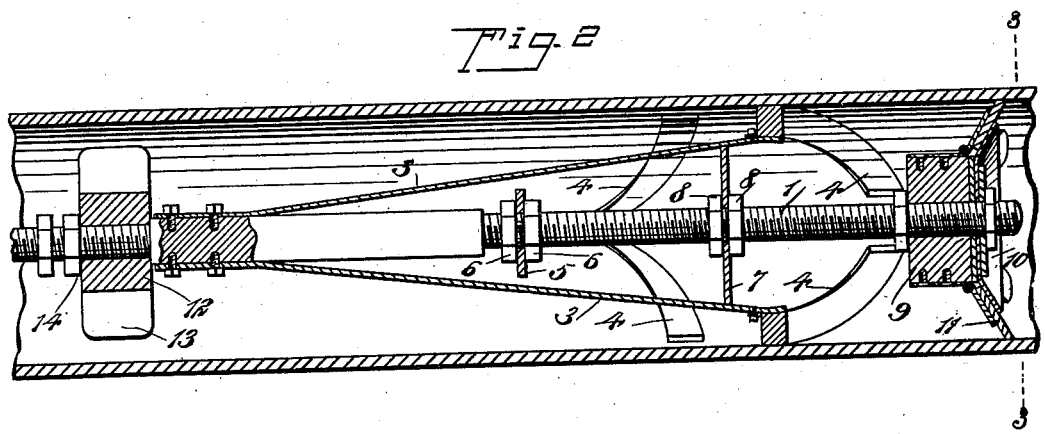
Figure 4:
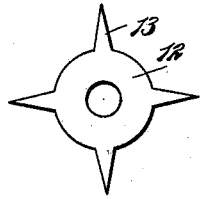
Figure 3:
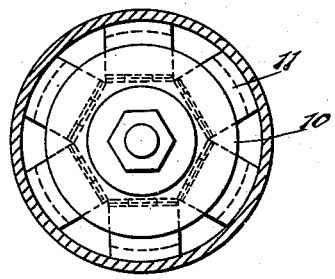
Figure 5:
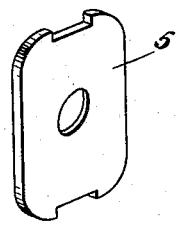

Figure 1 is a side elevation of a tube-scraper embodying my invention, illustrating the same as in a tube which is shown in longitudinal section. Fig. 2 is a partial section and partial elevation of the scraper. Fig. 3 is an end view of the scraper, the tube being shown in section on the line 3 3 of Fig. 2. Fig. 4 shows a centering device employed, and Fig. 5 is a perspective view of a spreader employed.

Referring to the drawings, 1 designates the scraper-stem, and secured to the four sides of this stem are resilient scraper-carrying arms 2 3. It will be noticed that the opposite arms 3 are longer than the arms 2, so that the scrapers carried by one set of arms will be forward of the scrapers carried by the other set of arms. On the end of each arm is a V-shaped scraper 4, the members of each scraper being conformed to the interior of the tube. The opposite arms 2 may be adjusted radially by means of a spreader-plate 5 engaging around the stem 1 and held as adjusted on said stem by means of nuts 6, which engage the threaded portion of the stem at opposite sides of the spreader-plate. A similar spreader-plate 7 is employed for adjusting the arms 3. This spreader-plate 7 is held as adjusted by means of nuts 8.

On the forward end of the stem 1 is a piston, comprising a block 9 and a cup-shaped disk 10, of leather or similar flexible material. Having hinge connection with the block 9 and radiating therefrom is a series of scraper-blades 11, which of course bear with their outer ends against the interior of the tube. These scraper-blades during the movement of the device through a tube will not only act as centering devices for the piston, but will remove any matter that may be loosened by the scrapers from the interior of the tube. The spaces between adjacent blades will permit the passage of water for the purpose of washing out the tube.

On the rear end of the stem is a centering device, comprising a block 12, having radial wings 13, which engage at their ends with the interior of the pipe. This centering device is here shown as held in place by means of a nut 14 engaging with the threaded portion of the stem. When it is desired to operate the device manually, a long handle may be engaged with the threaded rear end of the stem, and by this means the scraper may be drawn back and forth through a tube.

The device may be operated by steam, water, or similar pressure by applying the pressure against the piston 10.

Having thus described my invention, I claim as new and desire to secure by Letters Patent—

A tube-scraper, comprising a stem, spring-arms on said stem, V-shaped scrapers on each arm, the members of each scraper being laterally curved to conform to the interior of a tube, spreader-plates for the arms, and movable on the stem, nuts for engaging against opposite sides of the plates, a centering device on the stem and a yielding piston on the stem, substantially as specified.

Dated this 28th day of July, 1898.

SAMUEL CRAWSHAW.

Witnesses:
JOHN PATERSON,
JOHNSTON DUGUID.